United States Patent [19]
Harris et al.

[11] Patent Number: 5,538,337
[45] Date of Patent: Jul. 23, 1996

[54] LOCKED WHEEL REAPPLY IN ABS CONTROL SYSTEMS

[75] Inventors: Alan L. Harris, Balsall Common; Mark I. Phillips, Yardley, both of England

[73] Assignee: Lucas Industries Public Limited Company, West Midlands, England

[21] Appl. No.: 380,697

[22] Filed: Jan. 30, 1995

[30]    Foreign Application Priority Data

Feb. 1, 1994 [GB] United Kingdom .................. 9401866

[51] Int. Cl.⁶ ...................................................... B60T 8/32
[52] U.S. Cl. ......................... 303/156; 303/174; 303/158
[58] Field of Search ..................................... 303/157, 158, 303/156, 155, 174, 164, 122.07, 195; 188/181 C; 364/426.01, 426.02

[56]    References Cited

U.S. PATENT DOCUMENTS

| | | |
|---|---|---|
| 3,888,550 | 6/1975 | Reinecke et al. . |
| 3,912,340 | 10/1975 | Bertolasi . |
| 4,054,328 | 10/1977 | Leiber et al. . |
| 4,209,203 | 6/1980 | Brearley ................................. 303/174 |
| 4,335,431 | 6/1982 | Takahashi ............................. 303/164 |
| 4,398,260 | 8/1983 | Takahashi et al. ..................... 303/174 |
| 4,647,115 | 3/1987 | Leiber et al. . |
| 4,769,758 | 9/1988 | Masaki et al. . |
| 4,852,953 | 8/1989 | Brearley et al. . |
| 4,900,099 | 2/1990 | Braschel . |
| 4,923,255 | 5/1990 | Braschel et al. . |
| 4,938,544 | 7/1990 | Braschel et al. . |
| 4,985,839 | 1/1991 | Dominke ................................. 303/174 |
| 5,249,852 | 10/1993 | Beyer et al. . |
| 5,251,970 | 10/1993 | Braschel et al. . |

FOREIGN PATENT DOCUMENTS

| | | |
|---|---|---|
| WO88/02709 | 4/1988 | WIPO . |
| WO90/06869 | 6/1990 | WIPO . |
| WO91/06453 | 5/1991 | WIPO . |

*Primary Examiner*—Douglas C. Butler
*Attorney, Agent, or Firm*—Oblon, Spivak, McClelland, Spivak, & Neustadt

[57]    ABSTRACT

An anti-skid braking system for wheeled vehicles having fluid actuated brakes associated with the vehicle wheels, speed sensors associated with the vehicle wheels and a cyclically operating control device which is responsive to speed signals from the speed sensors to actuate a pressure dump device to periodically release the fluid pressure applied to the brake of any wheel which is determined to be about to lock and to later re-apply the actuating pressure to that brake when the tendency of that wheel to lock has reduced, and wherein the pressure dump phase is arranged to be cancelled during wheel-lock when the aggregate dump time for the current cycle exceeds a limit value based upon a weighted-average dump time of previous cycles.

4 Claims, 9 Drawing Sheets

LOCKED WHEEL REAPPLY IN ABS CONTROL SYSTEMS

The present invention relates to anti-lock (ABS) braking systems for road vehicles.

It will be helpful to the understanding of the following discussions of the present invention to identify and explain the two basic types of control systems conventionally used to control the supply of pressurised fluid to the brake actuator(s) of the braking system. The first type is normally referred to a solenoid/solenoid or Two Solenoid per channel and the other type is normally referred to as the Flow-Valve type. The basic construction and function of these two systems is now described.

In a Solenoid/Solenoid or two solenoid per Channel system two solenoids control two fluidic valves adapted to control firstly the communication between the pressure source (master cylinder) and a brake actuator, and secondly, the communication between that brake actuator and a low pressure reservoir (talc or expander) which usually forms the inlet to a return pump adapted to supply fluid under pressure to the pressure source. The first valve is commonly known as the inlet valve, the second valve thus being the outlet or as more commonly known, dump valve. The inlet valve has two main functions, (1) to block communication between the pressure source and the brake actuator when the brake pressure is being reduced by the dump valve, and (2) to control the rate at which the brake pressure is reapplied to the brake actuator during the apply phase by control of the solenoid pulse rate. An early example of this type of control system can be found in GB-A-1 243 523.

On the other hand, in a Flow-Valve system the inlet valve of the above described Solenoid/Solenoid system is replaced by a spool valve controlled by the presence of a pressure differential across it. The control functions it performs are substantially identical to that of the solenoid controlled inlet valve above, i.e. blocking of the inlet connection and application rate control, except that the flow valve is arranged to provide substantially a constant flow rate, i.e. fixed reapplication rate. Variation in this rate can be achieved by pulsing of the dump valve, but for the majority of operational conditions the tuned fixed rate is satisfactory. An example of this type of control system can be found in our EP-A-202845.

Refined anti-lock control of a vehicle braking system requires accurate assessment of individual tire-to-road slip based upon observations of the speed of all the wheels. The behaviour of the wheel depends upon its momentary position upon the prevailing μ-slip characteristic i.e. the characteristic curve of brake friction coefficient (μ) against percentage wheel slip. Thus optimum control depends critically upon accurate interpretation of slip. Precise speed measurement is a key element of this process.

Good control is difficult to ensure at low vehicle speed because the μ-slip characteristic becomes compressed into a small dynamic range, so that small changes in wheel-speed are more significant as the vehicle speed falls. However, because the measurement of speed is resolved into increments of fixed magnitude, the system's resolution of slip becomes coarser as the speed of the vehicle reduces. Furthermore, most contemporary systems are unable to register very low speeds reliably, and so a lower limit (e.g. 2 Km/h) is set, below which the wheel is assumed to be locked.

One consequence of these effects is that sensitive detection of an impending skid becomes more difficult as the road speed is reduced. A point will be reached where the observable slip changes from the stable (positive slope) to the unstable (negative slope) side of any given μ-slip characteristic within the span of a single ECU scan period. At speeds below this point, the system's response (reducing the brake pressure) becomes progressively later—in slip terms—and there will be a trend for the peak slip levels to increase as the speed continues to fall. The recovery pressure, that is, the pressure in the brake when pressure dump is terminated in response to signs that recovery from the skid is imminent, will decline correspondingly because most surfaces have tire-to-road friction characteristics in which the adhesion diminishes as the wheel is forced into higher slip, so that the road-adhesion-generated torque must be opposed by a smaller brake-generated torque before recovery can occur. This alone will tend to produce a cyclical variation of braking force which, as the speed falls, will become more pronounced due to the increasing dump amplitude and corresponding extension of the re-apply time, i.e. from the end of a pressure dump phase until the beginning of the next one; but the effect upon the car is relatively minor in comparison with the effect which is now described.

The problem is that, eventually, the wheel will lock transiently during each cycle. On high-μ surfaces, wheel-lock may only occur on the last, or possibly the penultimate cycle; but on low-μ surfaces the slower decay of vehicle speed means that several cycles might be completed in this fashion before the vehicle comes to rest.

More severe modulation of the vehicle deceleration, coupled to a noticeable loss of efficiency can occur due to a progressive elongation of wheel-lock periods.

If the wheel is locked then the first sign of recovery will be registration of a speed one increment above the lower-limit speed (e.g 3 Km/h). The result is that the first stages of recovery pass unnoticed. Looking at, for example, the extreme case of a vehicle speed of 4 Km/h. The wheel will have already completed three-quarters of its recovery (i.e from 100% slip to 25% slip) before the system becomes aware that it is no longer locked. For a less extreme case one could consider a vehicle speed of 12 Km/h. At a deceleration rate of 1 m/s (ice) the vehicle will take a further 3.3 seconds to stop; i.e. several more cycles can be expected. The recovery will be 25% complete (i.e. 75% slip) before the system takes notice. Since the recovery accelerations tend to be exponential (due to the shape of the μ-slip characteristic it is possible that 50% of the recovery time will already have elapsed.

Thus the perceived wheel-lock periods are incorrect. For a large part of them, the wheel is not locked at all, but the system is unable to be more precise. It would not be of too much concern if the wheel was being effectively braked during the whole "wheel-look" period, as it would be if it were genuinely locked; but unfortunately this is not the case because the brake pressure will be very low by this stage. This is because it is usual to maintain the pressure dump phase during periods of wheel-lock, provided that the vehicle is Judged to be still moving. The effect of the progressive increase in "wheel-lock" period is therefore to cause a further, steeper, and non-essential decline in "recovery pressure". Once the recovery is noticed and the dump phase terminated, the re-application of brake pressure must begin from an unnecessarily-low level; and it is likely that the wheel will be underbraked for a significant portion of the cycle due to early attainment of vehicle synchronous speed (because the opposing brake torque is relatively low) and because of the consequent additional time needed for skid-pressure to be re-established. Furthermore, the rapid wheel acceleration allowed by the low brake pressure will result in energy absorption transients of greater magnitude, which can become noticeable.

The overall effect is twofold. A general efficiency loss can be coupled with uncomfortable modulation of the vehicle deceleration. The decelmodulation is caused by a reduction in cycling frequency (due to the "wheel-lock" dump-extension plus the extra re-apply time) so that the behaviour of each wheel has a discrete effect. Systems with a fixed pressure re-apply characteristic, e.g. conventional flow-valve systems using a spool valve controlled by the presence of a pressure differential across it to achieve substantially a constant flow rate, will be more seriously affected than those where the gradient can be controlled in an adaptive fashion. The worst situation would be braking at low speed on a low-μ downhill gradient, where the stopping distance may be noticeably increased.

The traces shown in the attached FIGS. 3 and 4 illustrate the operation of the prior-art system working on ice. The uppermost line shows the vehicle deceleration, with peaks and troughs shaded around a mean level; below which are two pairs of lines showing the wheel speed and corresponding pressure for the two front wheels. The zero points for the wheel speeds have been set such that the 2 km/h lower-limit speed corresponds with one of the scaling grid lines (so as to more easily identify wheel "locking"). Zero speed is shown by the dashed lines. Solenoid energisation is shown by the binary traces above the grid area. Both traces show wheel "locking" during the last few cycles, with rapid acceleration at the end of the lock period, low recovery pressures, pronounced modulation of the vehicle's deceleration and resulting loss of efficiency.

It is an object of the present invention to overcome the problems of the prior art described above.

In accordance with the present invention, this is achieved in that the pressure dump phase is arranged to be cancelled during wheel-lock when the aggregate dump time for the current cycle exceeds a limit value based upon a weighted-average dump time of previous cycles.

Preferably, if the wheel is still locked after a predetermined period following the dump cancellation (eg 50 ms), the dump phase is restarted.

Preferably, should any wheel activity be detected during the second dump phase period, the dump phase cancellation is restarted. Thus, for example, if this "re-dump" occurs, then a second cancellation can be allowed if any wheel-speed sensor activity is observed, but in this case the predetermined re-apply period may be shorter (e.g. 28 ms).

The invention is described further hereinafter, by way of example only, with reference to the accompanying drawings, in which.

Figure 5:
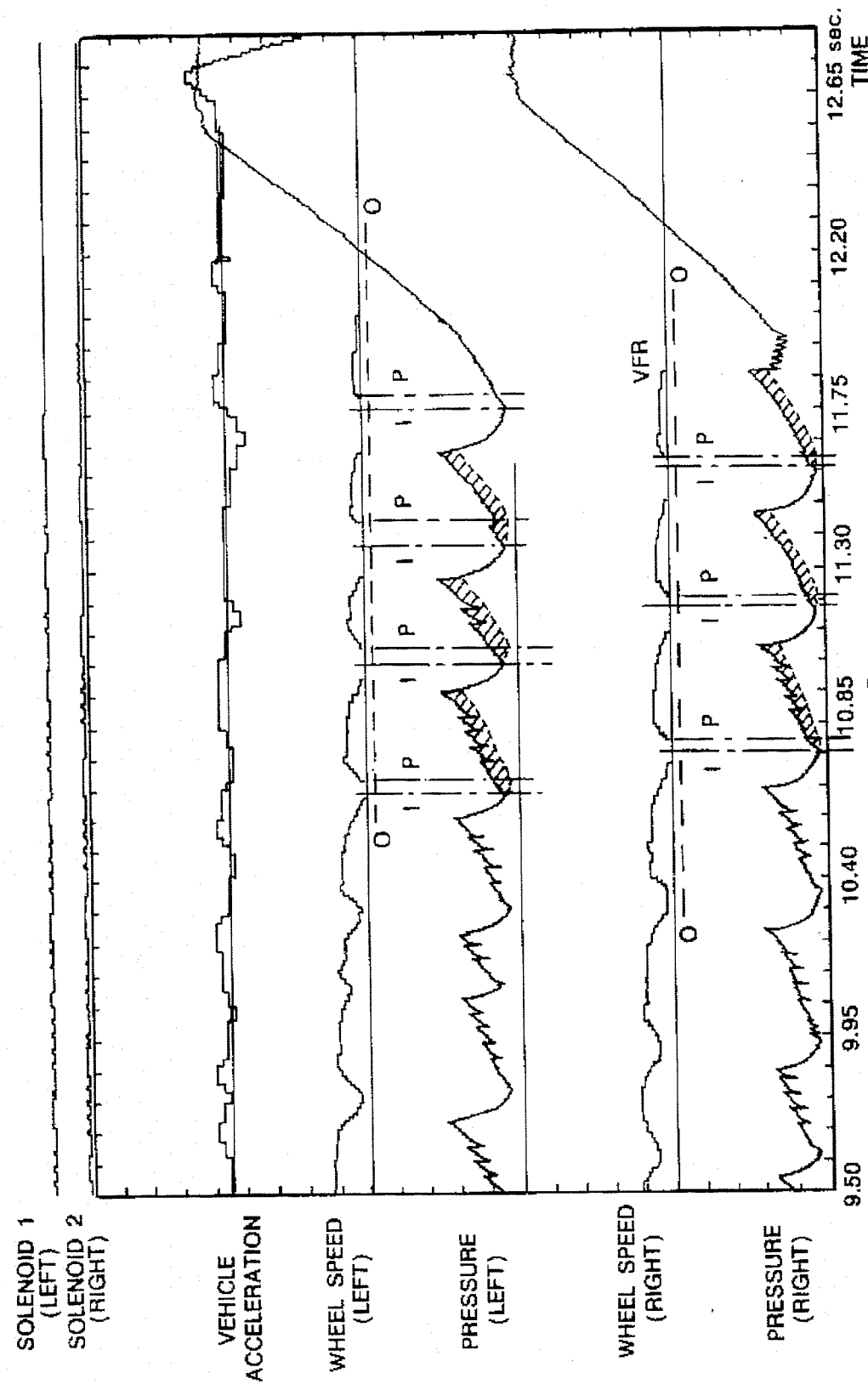
Figure 6:
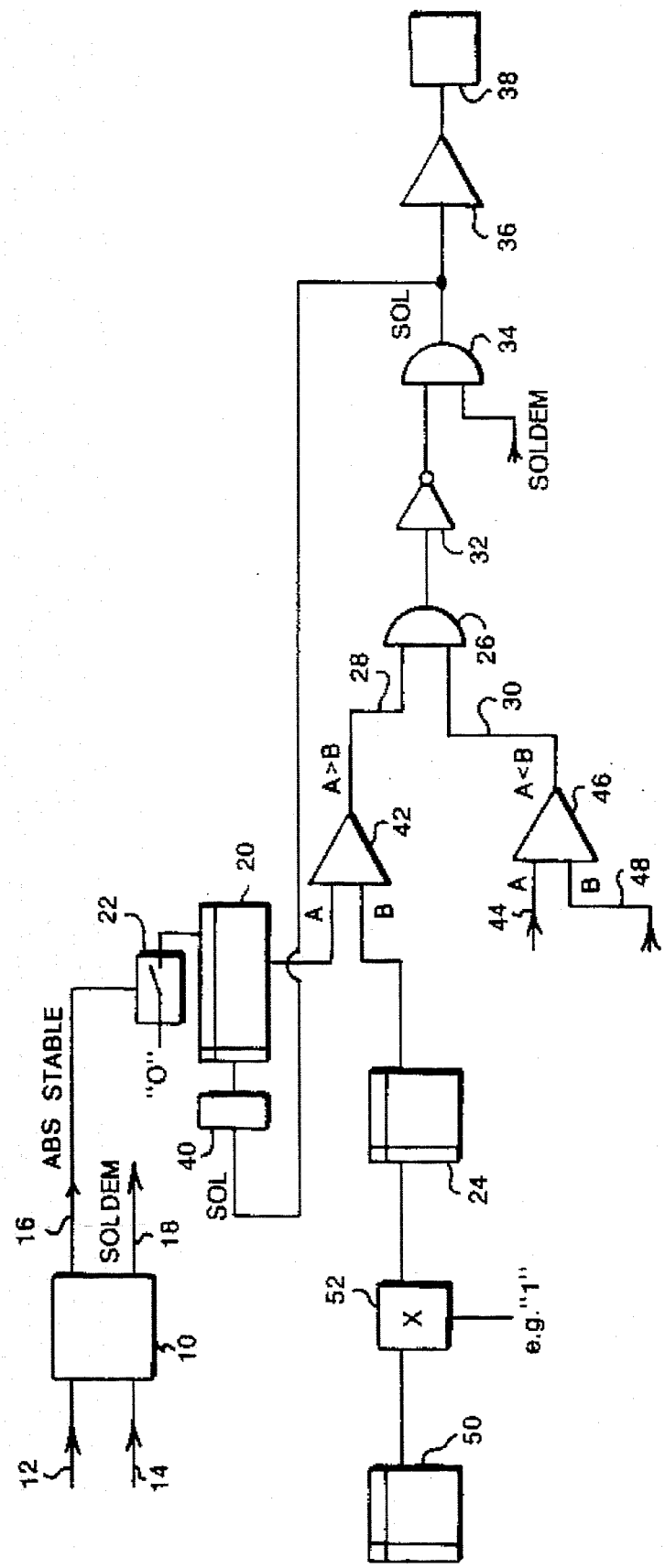
Figure 7:
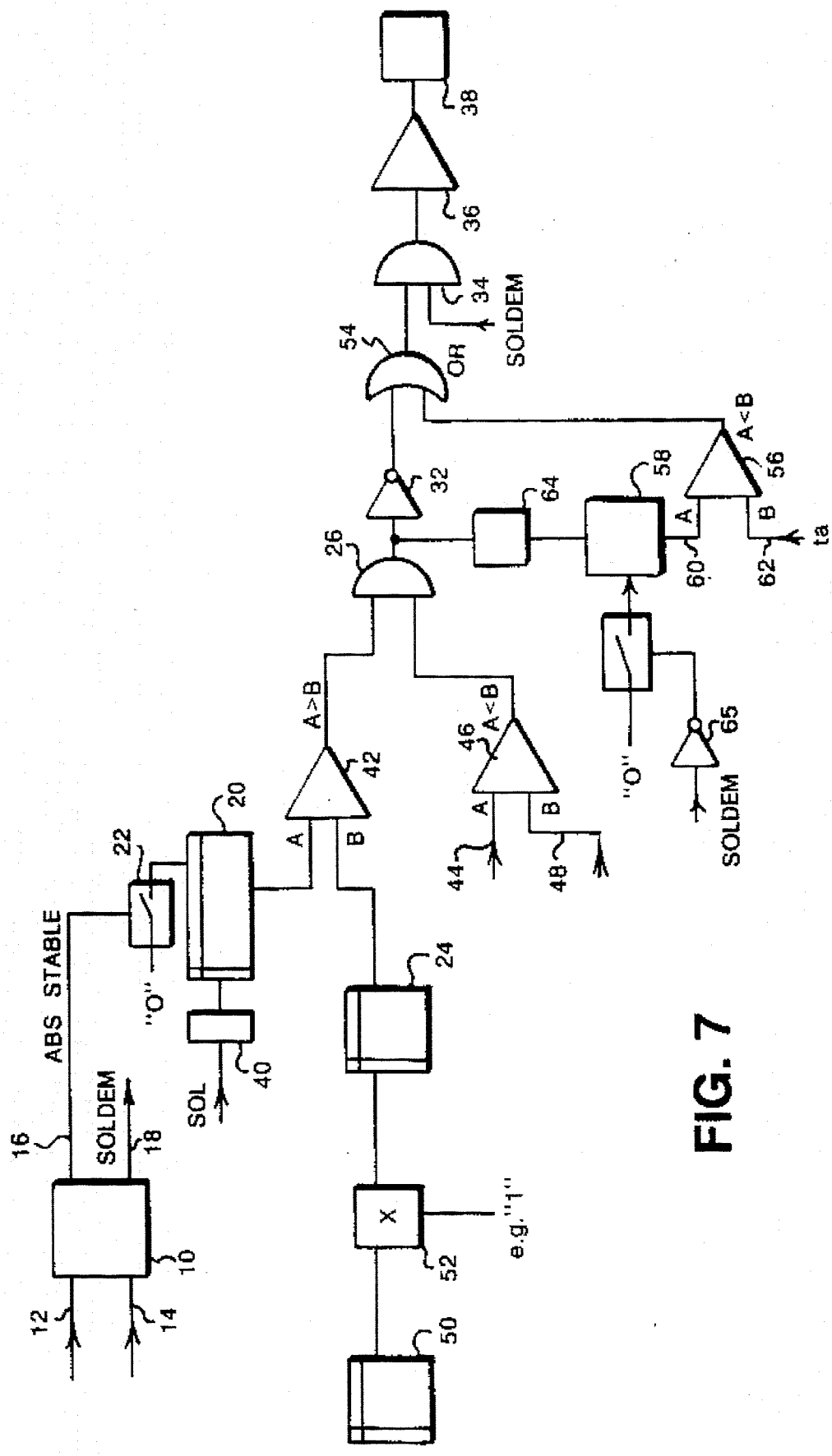
Figure 8:
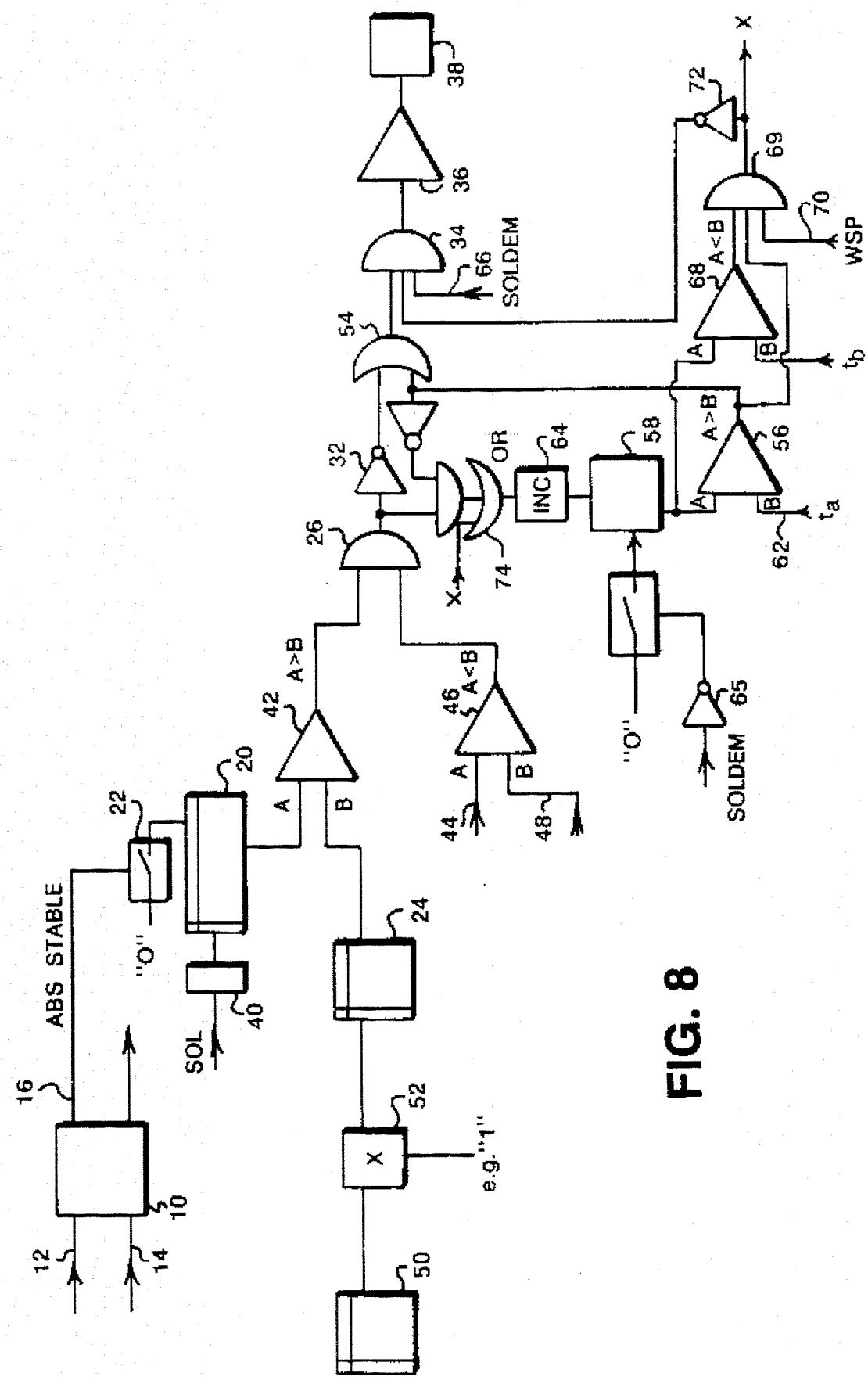
Figures 9, 9A:
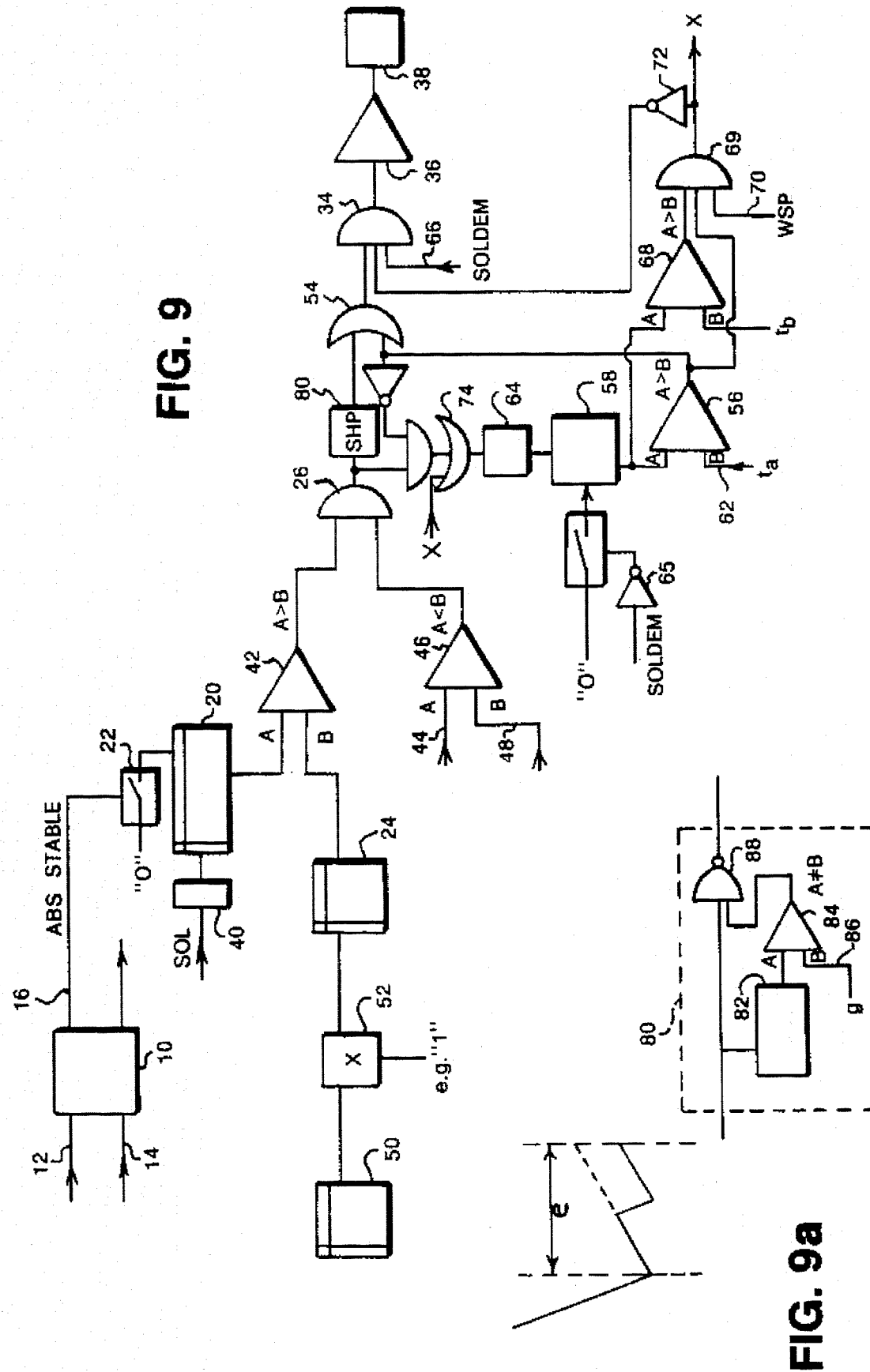

FIG. 5 comprises a set of traces illustrating the operation of a system which is adapted in accordance with the present invention;

FIG. 6 is a diagrammatic illustration of one embodiment of a system in accordance with the present invention enabling the turning off of the dump solenoid after a first predetermined time;

FIG. 7 is a diagrammatic illustration showing how the arrangement of FIG. 5 can be further developed to enable the dump solenoid to be reapplied after a second predetermined time;

FIG. 8 is a diagrammatic illustration showing how the arrangement of FIG. 5 can be further developed to enable dump cancellation after period with wheel speed pulse(s) activity; and FIGS. 9 and 9(a) are a diagrammatic illustration showing how the arrangement of FIG. 5 can be further developed to enable use of a simulated "hold" pulse.

Figure 1:
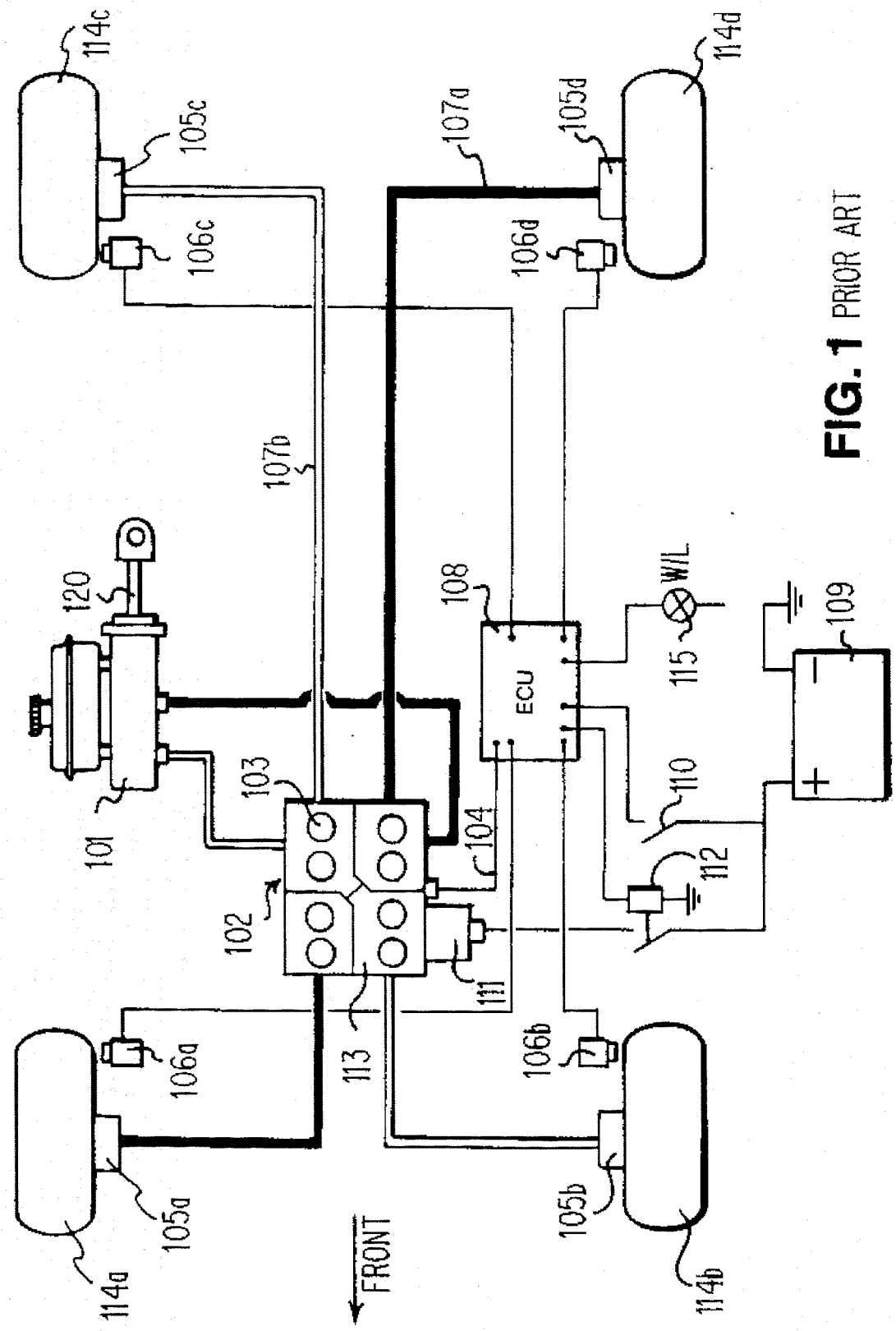
FIG. 1 is a schematic diagram of the basic hydraulic and electrical arrangement of a typical vehicle to which the present invention can be applied.

Referring first to FIG. 1 there is illustrated highly schematically the braking system for a vehicle having four wheels 114, to at the front 114a,114b and two at the rear 114c,114d. the system is of the X-split type having independent hydraulic circuits, with the first circuit 107a (black) actuating the front offside and rear nearside wheel brakes 105a 105d and the second circuit 107b actuating the front rearside and rear offside wheel brakes 105b,105c. A brake pedal (not shown) is mechanically connected to the actuating plunger 120 of a dual circuit master cylinder 101. The master cylinder 101 is connected to a modulator 102 comprising a plurality of control channels 113 having control valves 103, connected to an electronic control unit (ECU) 108 by control lines 104, the control valves 103 being adapted to control the communication between the master cylinder 101 and the brake actuators 105 controlling the wheels 114. Rotational speed of each wheel 114 is sensed individually by wheel speed sensors 106a–106d connected to the ECU 108 which is adapted to control the control valves 103 of the modulator 102 in dependence upon signals received from the wheel speed sensors 106.

The ECU 108 is powered from a battery/alternator circuit 109 of the vehicle via an ignition switch 110. The battery/alternator circuit 109 also supplies power to modulator pump motor 111 via a relay valve 112 controlled from signals generated by the ECU 108. Should the ECU 108 determine that an appropriate fault has occurred then a fault warning indicator (warning lamp) 115 is activated.

Figure 2:
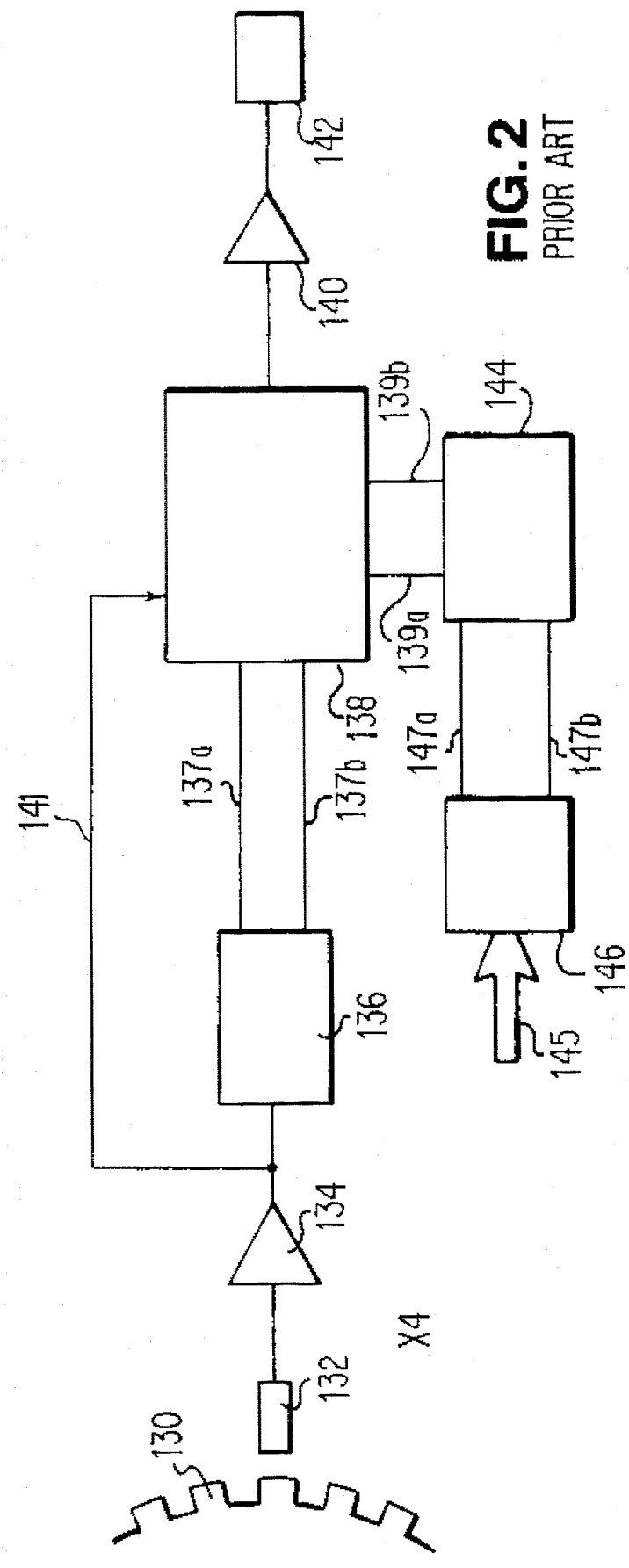
FIG. 2 is a schematic diagram illustrating the basic ABS function of the braking system.

Referring now to FIG. 2, there is illustrated a typical overall ABS system layout. Each vehicle wheel carries a respective exciter 130 whose rotation is detected by a sensor 132. The sensor signal, after signal conditioning at 134, is passed to a wheel speed and wheel deceleration calculating means 136 which establishes a wheel speed signal and a wheel acceleration/deceleration signal on lines 137a, 137b, respectively. The latter signals are passed to a computer 138 for calculating the relevant ABS functions. The ABS computer 138 also receives directly via a line 141 the raw speed pulses provided by the wheel speed sensor 132/134. The wheel speed signals are also input at 145 to a vehicle speed and acceleration estimation means 146 which establishes a vehicle speed signal and a vehicle deceleration signal on lines 147a and 147b, respectively. The latter signals are fed to a skid detection threshold calculating means 144 which provides to the computer 138 a slip threshold signal and a deceleration threshold signal on lines 139a and 139b, respectively. The computer uses the various signals to control the operation of a dump solenoid 142 via signal conditioning means 140.

The present invention relates to the control of an ABS system where it is 'believed' that a wheel or wheels have actually looked or are rotating at a speed which is lower than that which the system can reliably measure due to the system's resolution. In a system in accordance with the invention the dump phase of an ABS cycle is arranged to be cancelled should the dump time exceed a weighted average dump time for the preceding cycle or cycles. Upon cancellation, the wheel speed is assessed to see if recovery from the skid is actually taking place. If it is not, then the system re-dumps the applied pressure.

The advantage of applying the brakes before noticeable wheel recovery has been detected is of course that the brake application phase happens earlier with a resulting improvement in utilisation. Due to the system's lack of ability in detecting low wheel speed it may well be that the wheel has started to recover and the decision, based on analysis of the preceding events, is correct. However, as previously mentioned, should no wheel speed activity be detected after a preset time, the re-application is abandoned and the system reverts to the dumped condition until a measurable wheel speed signal is detected, whereupon re-application via the conventional detection logic is made.

The use of the technique of the present invention avoids the dump-phase undershoot described above; maintaining a higher brake pressure during wheel-recovery so that both efficiency and driving comfort are improved. The predetermined time limits are precautionary: it is probable that the wheel-speed will rise above the (2 Km/h) lower-limit speed within the period allowed. If this does not occur, then it is possible that operating conditions such as tire load or surface adhesion may have deteriorated such that lower pressures are needed before recovery can begin.

The weighting of the average-dump time allows the most recent cycles to dominate the result, and this means that the dump time allowed before cancellation can more quickly follow trends due to e.g. falling vehicle speed or changes is surface adhesion. Thus the use of fixed (e.g. 50 ms and 28 ms) periods becomes practicable.

One way of calculating "weighted average dump time (WADT)" is to use the expression:
$WADT_n$ (in a cycle n)=½. ($WADT_{n-2}$+dump time in the period $_{n-1}$).

Figure 3:
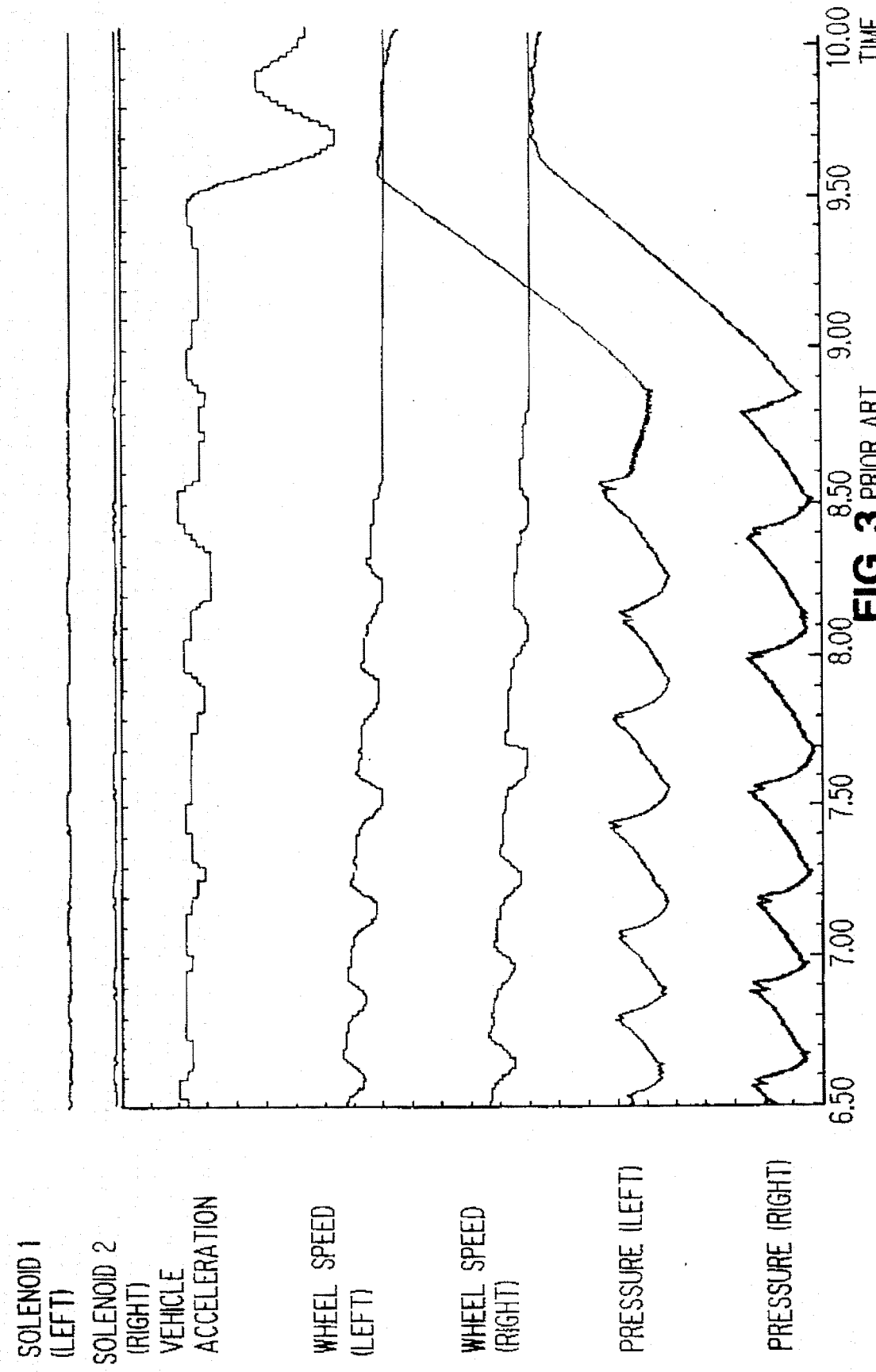
FIGS. 3 and 4 are traces illustrating the operation of the prior art system.
Figure 4:
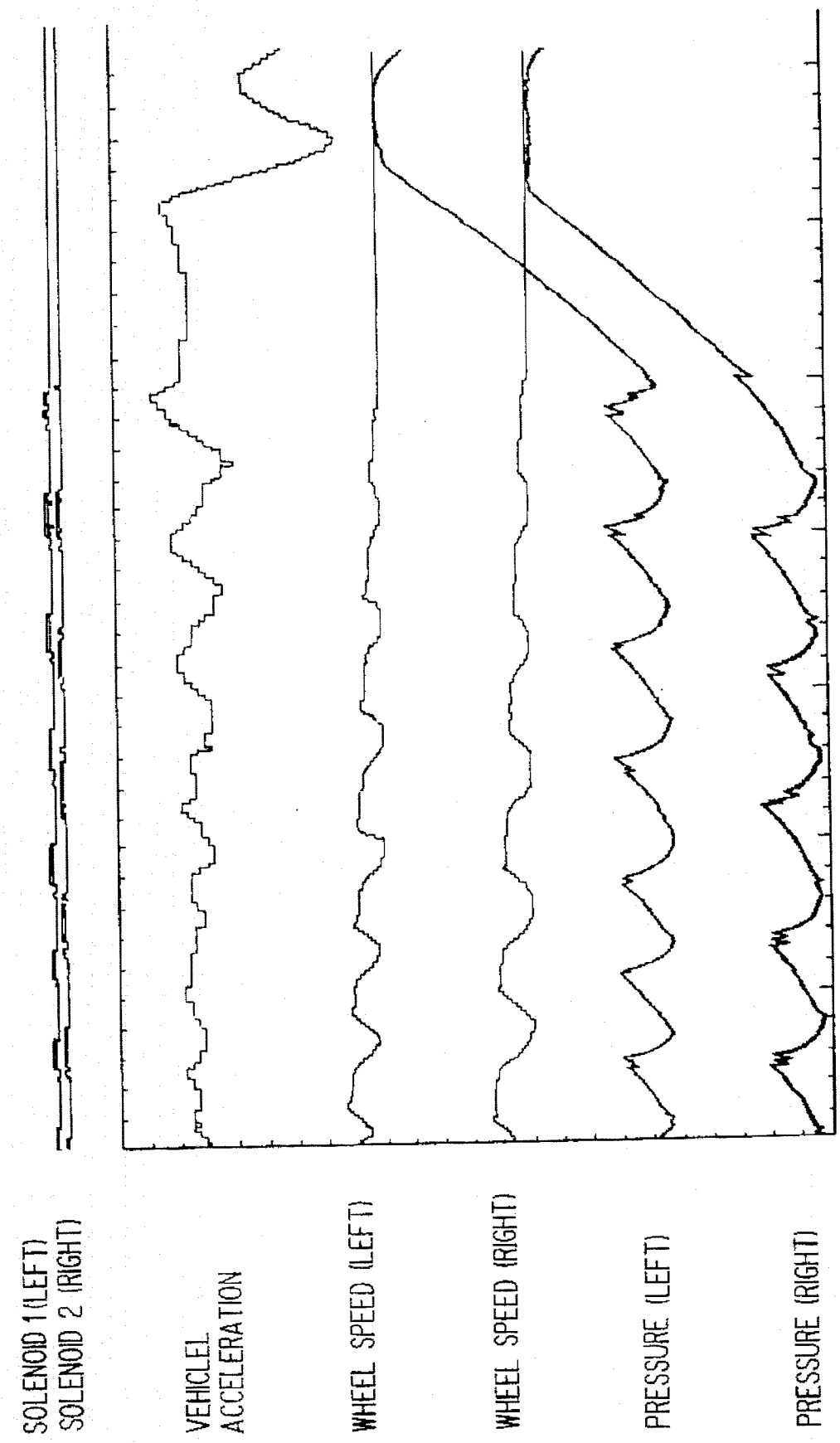

The traces of FIG. 5 show a system in accordance with the present invention working on ice. A comparison of FIG. 5 with FIGS. 3 and 4 shows that (a) the efficiency is maintained, (b) reduced deceleration modulation occurs.

In FIG. 5, the solenoid cancellation timing is marked for the invention at "I" and for the prior art at "P". The shaded areas on the pressure traces in FIG. 5 show the savings attributable to the invention.

The penultimate pressure dump on the front-left wheel shows a secondary dump at the expiry of the 50 ms period, but even in this case the invention was able to retain more pressure in the brake than the prior-art system would have achieved.

Tests on downhill snow-covered gradients have shown that the invention can achieve significant improvements in deceleration from a speed such as 12 Km/h to standstill.

Referring now to FIG. 6, there is shown one possible means for achieving the basic function provided by the present invention, namely a control arrangement for turning off the dump signal after a predetermined limit value based on the weighted average dump times of previous cycles has been reached. A conventional skid detection means 10 receives wheel speed signals and wheel acceleration signals on lines 12 and 14, respectively. The skid detection means 10 provides two output signals, the first is an ABS STABLE (or NO ABS ACTIVITY) signal on a line 16 and the second is a dump solenoid DEMAND signal SOLDEM on a line 18. If the ABS STABLE signal is present on line 16, then a SOLENOID TIER 20 is arranged to be set to zero via a reset, switch 22. If there is ABS activity, ie a SOLDEM (dump solenoid demand signal) and the Solenoid Dump Timer 20 is not more than a limit value held in a LIMIT STORE 24, then there is a FALSE signal on a first input line 28 to a main detection AND gate 26. Wheel speed is applied to one input line 44 of a comparator gate 46, whose other input line 48 receives a wheel speed value, eg 2 Kph, determined in accordance with the minimum calculable wheel speed. If there is no detectable wheel speed, ie below 2 KPH, then there will be a TRUE input on second input line 30 at said AND gate 26. This will result in a FALSE output from this gate 26 which is inverted in an inverter 32 and ANDed with the SOLDEM signal in a second detection AND gate 34 which provides a TRUE (or dump) signal for the driver 36 of the dump solenoid 38. This TRUE signal from the AND gate 34 is also fed back to an incrementer 40 or timer control of the solenoid timer 20 which will accumulate the time for which the dump solenoid is ON. A store 50 holds a value "WADTOPC" corresponding to weighted average dump time compared to previous cycles. The WADTOPC value is multiplied in a multiplier 52 by a fixed amount, eg "1", and passed to the LIMIT STORE 24 when the accumulated time for which the dump solenoid is ON reaches a LIMIT VALUE held in the LIMIT STORE 24, the output of the comparison in a comparator 42 will result in a TRUE signal on the line 28 This, when combined with a NO WHEEL SPEED signal on line 30 will produce a TRUE output from the first detection AND gate 26 which will be inverted at 32, thus giving a FALSE input to the second detection ANDgate 34 which, when combined with the TRUE SOLDEM signal, will produce a FALSE output which will terminate the dump solenoid signal. Should at any time the wheel speed rise above the minimum detection threshold, then the second input to the first detection ANDgate 26 will become FALSE, which will feed through to re-enable the dump solenoid signal. When the skid cycle recovers the wheel, the STABLE signal on line, 16 becomes TRUE which resets the SOLENOID TIMER 20 to zero ready for the next cycle.

FIG. 7 contains all of the abovedescribed dump control of FIG. 6 together with a means to re-enable the dump signal after a predetermined time ($t_a$). This is achieved by interrupting the solenoid dump control line with an OR gate 54 which allows the dump to be re-established if either the aforementioned conditions exist or if the pro-set period ($t_a$) has elapsed. One input of the OR gate 54 is coupled to the inverter 32 and its other receives the output of a comparator 56 which is TRUE if the output of a REAPPLY timer 58 is greater than a signal representative of a predetermined period ($t_a$) applied to its other input 62. The reapply timer 58 is incremented by an incrementer 64. The reapply timer 58 is reset to zero via an inverter 65 when the SOLDEM signal is not present.

FIG. 8 contains all of the abovedescribed dump control of FIG. 7 together with a means for achieving dump cancellation if, after the end of the period $t_a$ and with a further prescribed period $t_b$, there is some wheel speed pulse activity. A signal representative of the prescribed period $t_b$ is applied to one input of a further comparator 68 whose other input receives the reapply time signal from the timer 58. The output of the comparator 68 provides one input of a further AND gate 69, whose second input is coupled to the output of the comparator 56 and whose third input 70 receives a signal indicative of wheel speed pulses having taken place. The output of the AND gate 69 is coupled via an inverter 72 to a further input of the second detection AND gate 34. The output of AND gate 69 is also supplied as one input to an OR gate 74 which actuates the incrementer 64 if either input is TRUE. The latter circuitry operates in that if, after the end of the period $t_a$ and within the period $t_b$, some wheel speed pulse occurs (resulting in an input to AND gate 69 on line 70), then the output of AND gate 69 is TRUE which is inverted at 72 to apply a FALSE input to the AND gate 34, thereby switching OFF this ANDgate 34 to cancel the solenoid dump signal to the solenoid 38 and thereby re-apply the brake, An alternative to using an initial relatively large period $t_a$, during which the brakes could conceivably be re-applied too quickly, especially on a very low mu (μ) surface, is to inject a "simulated hold pulse" (SHP) or short duration pulse which has the effect of slowing or holding the pressure rise rate down during the dump cancellation phase of period $t_a$. As indicated in FIG. 9 this can be achieved by inserting an SHP generator 80 (see FIG. 9a for detail) after the first detection ANd gate 26. The SHP generator 80 comprises a timer 82 providing one input to a comparator 84 whose other input 86 receives a signal representative of a preset period ($t_g$) (eg 28 ms). The output of the comparator 84 is NANDed in an NAND gate 88 with the output of the first detection gate 26. The AND gate 86 in the SHP 80 therefore, ANDs the preset timed period of the timer 82 with the normally inverted dump cancellation signal derived from the first detection comparator 42. The SHP timer 82 is started when the signal from the comparator 42 becomes TRUE, ie the SOL TIMER 20 exceeds the LIMIT VALUE 24, and, when the pre-set period ($t_g$) of the timer 82 is reached, one input to the NAND gate 88 of the SHP 80 is set to TRUE, the other input already receiving a TRUE signal from the comparator 42. The result is an inversion, providing a FALSE signal to the second detection AND gate, 34 which has the effect of cancelling the dump cancellation signal (produced in the manner described hereinbefore) for a short period of time, ie the brake pressure is dumped for a short period which holds back for a brief period the pressure rise rate.

We claim:

1. An anti-skid braking system for wheeled vehicles having fluid actuated brakes associated with the vehicle wheels, comprising:

speed sensors associated with the vehicles wheels;

a cyclically operating control device which is responsive to speed signals from the speed sensors to actuate a pressure dump device to periodically release the fluid pressure applied to the brake of any wheel which is determined to be about to lock and to later re-apply the actuating pressure to that brake when the tendency of that wheel to lock has reduced;

means for detecting whether the current vehicle wheel speed is below a predetermined level corresponding to a lowest reliably measurable value;

a means for establishing a limit value for dump time in a current cycle of the control device, based upon a weighted-average dump time of previous cycles;

a means for establishing the aggregate dump time for a current cycle;

a calculation means for establishing whether the limit value is exceeded by the latter aggregate dump time, and a means for immediately cancelling the pressure dump phase during wheel lock when the calculation means establishes that said aggregate dump time has exceeded said limit value and when said detecting means indicates that the vehicle wheel speed is below said predetermined level.

2. An anti-skid braking system according to claim 1, further including a means by which, if a wheel is still locked after a predetermined period following the dump cancellation, the dump phase is restarted.

3. An anti-skid braking system according to claim 2, further including a means by which, if any wheel activity is detected during the restarted dump phase period, the dump phase cancellation is restarted.

4. An anti-skid braking system according to claim 3, further including a means for establishing a simulated hold period within which the pressure rise rate during the dump cancellation phase is arranged to be held down.

* * * * *